United States Patent [19]
Hindman et al.

[11] Patent Number: 5,706,145
[45] Date of Patent: Jan. 6, 1998

[54] APPARATUS AND METHODS FOR AUDIO TAPE INDEXING WITH DATA SIGNALS RECORDED IN THE GUARD BAND

[76] Inventors: Carl L. Hindman, 29617 Whitley Collins Dr.; Hing Y. Ngai, 6922 Lofty Grove Dr., both of Rancho Palos Verdes, Calif. 90274

[21] Appl. No.: 295,600

[22] Filed: Aug. 25, 1994

[51] Int. Cl.$^6$ .................................................. G11B 5/02
[52] U.S. Cl. ........................ 360/18; 360/22; 360/48
[58] Field of Search ........................ 360/48, 32, 63, 360/27, 72.1, 72.2, 22, 18

[56] References Cited

U.S. PATENT DOCUMENTS

| | | | |
|---|---|---|---|
| 3,102,170 | 8/1963 | De Koning | 179/100.2 |
| 3,684,841 | 8/1972 | Boehme | 179/100.2 |
| 3,732,364 | 5/1973 | Terada | 178/6.6 A |
| 3,913,135 | 10/1975 | Damlamian | 360/79 |
| 3,916,121 | 10/1975 | Stuzzi | 179/100.1 |
| 4,194,222 | 3/1980 | Ebbinga | 360/18 |
| 4,210,785 | 7/1980 | Huber et al. | 179/100.1 |
| 4,296,491 | 10/1981 | Jerome | 369/59 |
| 4,405,959 | 9/1983 | Chabrolle | 360/119 |
| 4,445,150 | 4/1984 | Nakamima et al. | 360/18 |
| 4,460,929 | 7/1984 | Bader | 360/30 |
| 4,498,111 | 2/1985 | Rijckaert et al. | 360/27 |
| 4,527,202 | 7/1985 | Ohta | 360/18 |
| 4,547,817 | 10/1985 | Klassen | 360/29 |
| 4,571,641 | 2/1986 | Fujiki et al. | 360/19.1 |
| 4,630,134 | 12/1986 | Kanamaru | 358/343 |
| 4,692,818 | 9/1987 | Fujibayashi | 360/22 |
| 4,796,106 | 1/1989 | Veillard | 360/30 |
| 4,849,831 | 7/1989 | Hino | 360/14.1 |
| 4,849,837 | 7/1989 | Zwicky | 360/68 |
| 4,853,798 | 8/1989 | Fukuju et al. | 360/38.1 |
| 4,870,515 | 9/1989 | Stokes | 360/72.2 |
| 4,945,439 | 7/1990 | Sato | 360/124 |
| 5,040,083 | 8/1991 | Matsumoto et al. | 360/77.01 |
| 5,046,004 | 9/1991 | Tsumura et al. | 364/419 |
| 5,062,008 | 10/1991 | Ichinoi et al. | 360/29 |
| 5,212,551 | 5/1993 | Conanan | 358/143 |

*Primary Examiner*—Andrew L. Sniezek
*Attorney, Agent, or Firm*—Christie, Parker & Hale, LLP

[57] ABSTRACT

Apparatus and methods are disclosed for providing an indexed audio tape. The method includes the step of recording data in a guard band interposed between and parallel to two signal tracks used to record audio signals on an audio tape. The recorded data is shifted to frequencies higher than the bandwidth of the audio signals. A plurality of programs are recorded onto the two signal tracks with spaces between the programs. A nonaudible program presence signal is recorded onto the two signal tracks coincident with the plurality of programs. The nonaudible program presence signal is not recorded in the spaces between the programs. A program directory is recorded onto the guard band just before the start of each program recorded on the two signal tracks. In an embodiment, text is recorded onto the guard band parallel to and corresponding to audio in the programs recorded on the two signal tracks of the audio tape. Methods and apparatus are provided for reading the directory from the guard band and for accessing a program on the tape using the directory. Methods and apparatus are also provided for playing a program from the two signal tracks on an audio tape and simultaneously reading text from a guard band parallel to and between the two signal tracks, the text corresponding to audio in the programs recorded on the two signal tracks.

33 Claims, 13 Drawing Sheets

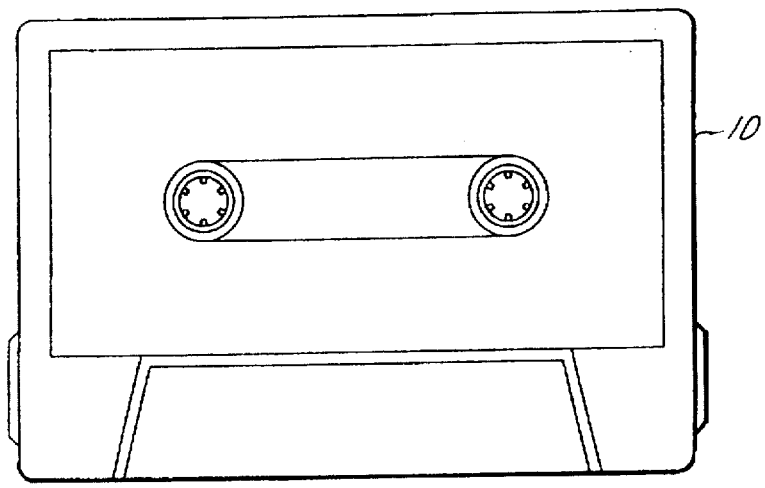
*PRIOR ART*
*Fig. 1*
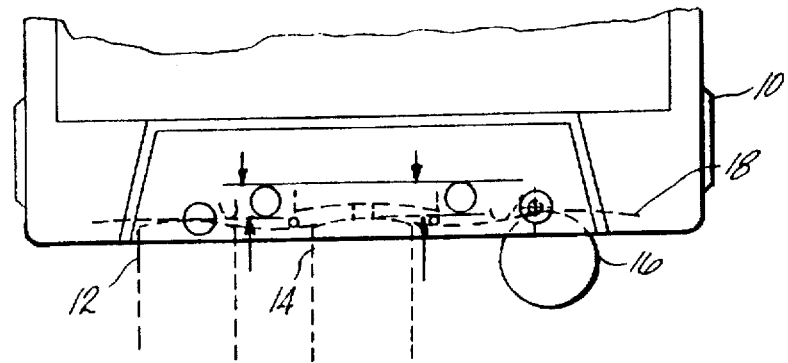
*PRIOR ART*
*Fig. 2*
*Fig. 3*
*PRIOR ART*

| PROGRAM NO. | PROGRAM TITLE | SIDE 1/SIDE 2 OF CASSETTE | SEEKING DATA |
|---|---|---|---|
| 1 | MOON RIVER | 1 | -80 |
| 2 | COUNTRY ROAD | 1 | -36 |
| . | ... | | ... |
| 18 | BLUE HAWAII | 2 | +265 |
| 19 | CHATTANOOGA CHOO CHOO | 2 | +172 |
| . | ... | | ... |
| 32 | A BRIDGE OVER TROUBLED WATER | 2 | -64 |

TOTAL NUMBER OF PRE-RECORDED PROGRAMS: 32

Fig. 7

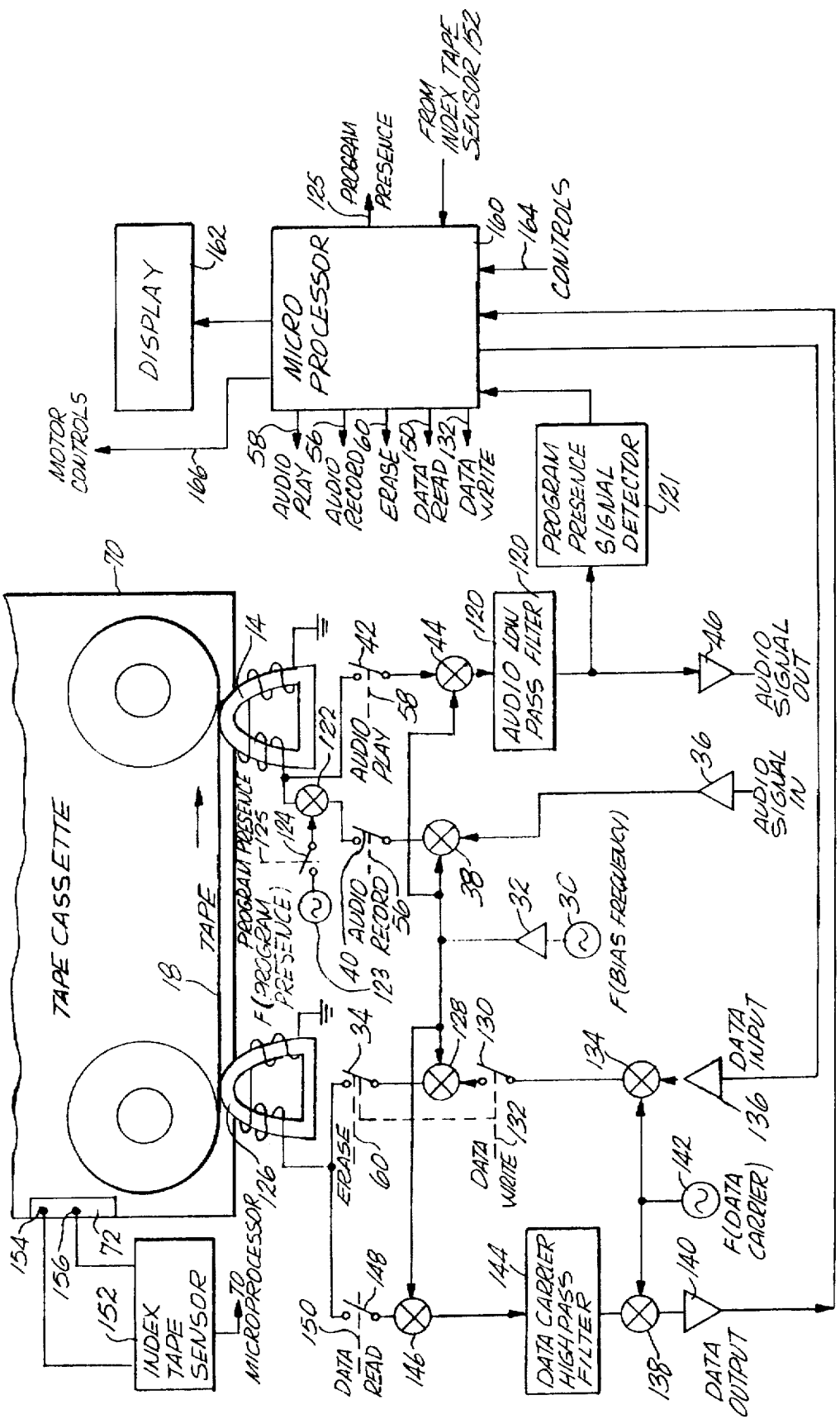

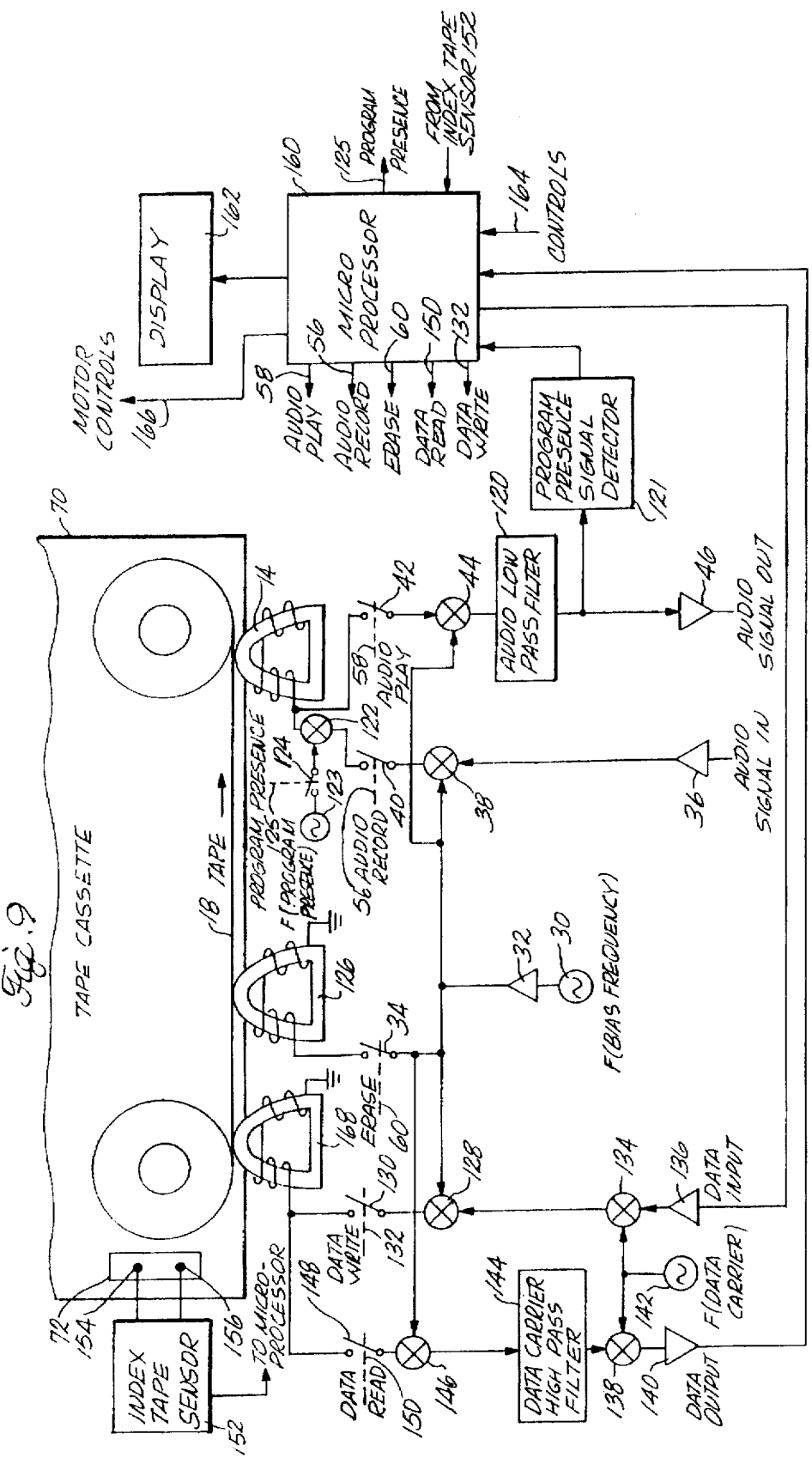

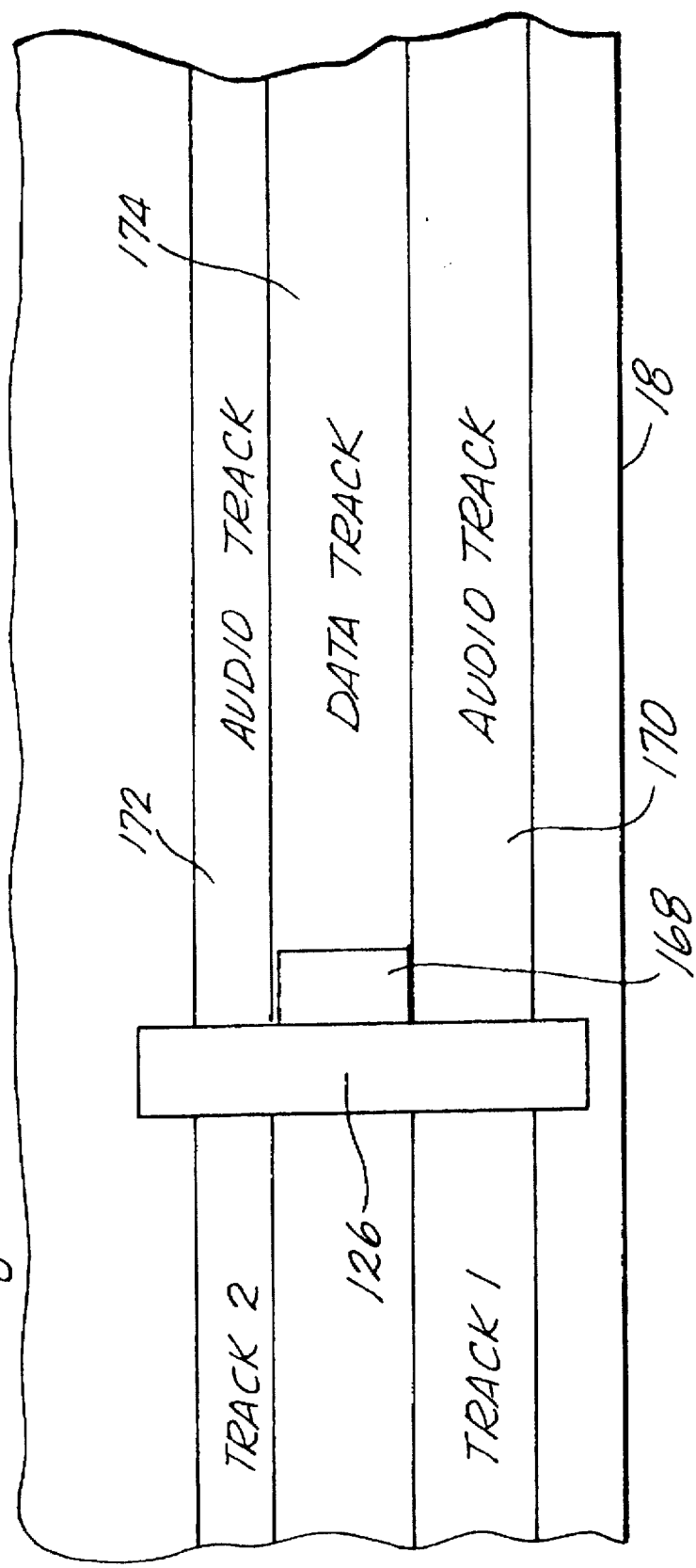

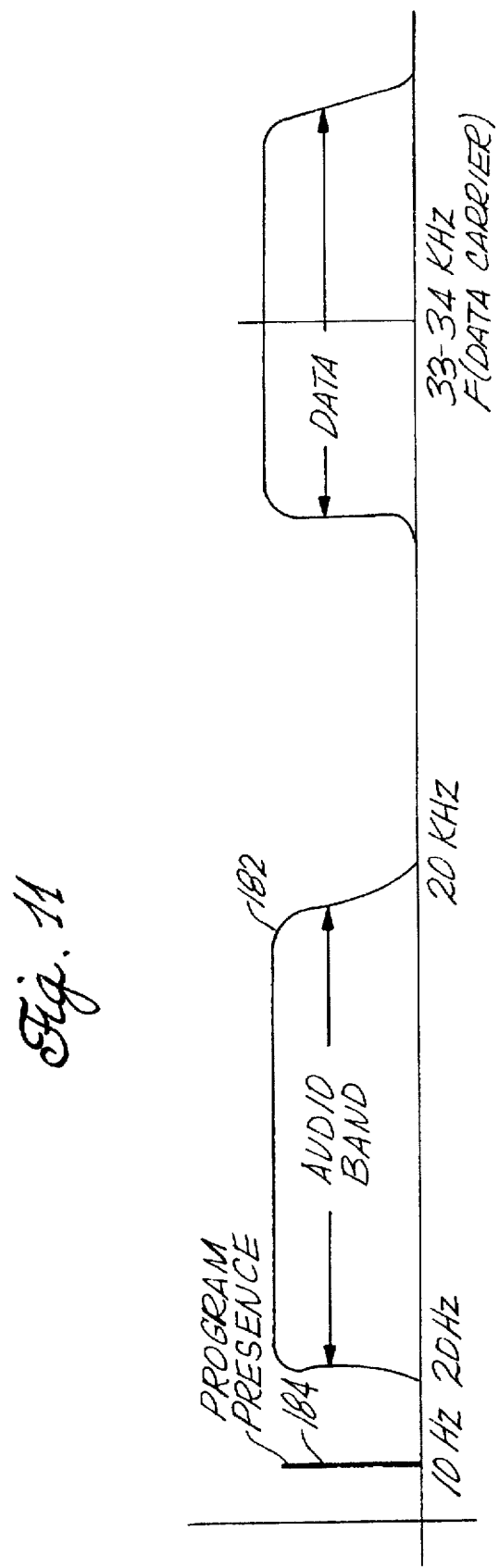

APPARATUS AND METHODS FOR AUDIO TAPE INDEXING WITH DATA SIGNALS RECORDED IN THE GUARD BAND

BACKGROUND OF THE INVENTION

1. Field of the Invention

This invention relates generally to audio cassette player/recorder systems and methods and apparatus for recording data on an audio cassette together with audio signals.

2. Description of the Related Art

Audio cassette players/recorders use tape, which by its nature is a sequential medium that is recorded and accessed sequentially. To find a particular program on the tape, it is necessary to search by listening to portions of the tape, which makes it virtually impossible to randomly access programs on the tape.

Generally audio cassettes have audio analog information recorded on the tape and it is not uncommon, especially for dictation applications, to record cuing information on the tape. Such cueing information refers to the insertion of signals, whose position on the tape marks a specific epoch, such as the beginning of a section of dictation. For example, U.S. Pat. No. 5,126,888 to Schranz records a 40 Hz tone and a 1 Khz tone for the purpose of indicating a type of special instruction that may accompany the material at a location.

Directory information written on a tape for accessing programs on the tape is disclosed in the prior art. For example, U.S. Pat. No. 4,933,781 to Nishimura discloses a directory stored at the end of all recorded programs. Also U.S. Pat. No. 5,038,231 to Harigaya discloses a digital audio tape recorder which records a directory on the tape in a particular area. When the tape is inserted the directory is read into a memory and then erased from the tape. When the tape is ejected, an updated version of the directory is recorded back onto the tape.

While these prior art systems provide some capability for randomly accessing programs on an audio tape, these systems are still inconvenient to the user.

It is desirable to be able to record data onto a tape in parallel with audio channels, and then be able to read the recorded data. It is also desirable to have a system that provides this capability with very little, if any, modification of standard audio cassettes. The recorded data should not interfere with the ability to reproduce quality audio. It is also desirable to be able to record a directory on the tape and to automatically access the directory to have a play/record system that can automatically access selected programs. Also it is desirable to have an automatic means for determining when maintenance actions should be taken to clean a record/play head. Another desired feature is to record lyrics in parallel with recorded audio.

Karaoke has achieved enormous popularity worldwide across all age groups. Karaoke is a video sing-along. Lyrics of a song being played are displayed in real time and in synchronization with the music of the song as it is being played. Karaoke has become very popular in bars, on television shows, and at family gatherings.

As more people participate in karaoke, demand for consumer electronics that provide karaoke increases. Many existing video systems presently provide karaoke lyrics by use of media other than audio magnetic tape. For example, the lyrics to the song being played are recorded on a video tape. The lyrics are recorded on the video portion of the video tape in a manner similar to the recording of television images. Further, the lyrics may be superimposed over a television image of the performers of the music, such as a music video, or over other artistic video creations. Similarly, video disks may contain karaoke lyrics. As with video tape, the lyrics may be recorded along with other video information. Video disks usually store the lyrics and other video information digitally.

Audio tape recorders, such as cassette tape recorders, and audio tapes are not presently equipped to handle karaoke. In particular, a magnetic audio tape is divided into two longitudinal regions on the tape. One region of the tape is for recording and playing music when the tape is moving in one direction and the other region is for recording or playing music when the tape is moving in the opposite direction. Each region is divided into two spaced apart longitudinal tracks for recording music for the right and left channels of a stereo recording. Many tape players record either digital data which could be music or analog data, particularly music. Space for recording a separate track for karaoke lyrics is extremely limited on the tape. Furthermore, recording a third track may prevent karaoke tapes from being played on existing cassette recorders when it is desired not to display the karaoke lyrics.

There is a need for a cassette tape player/recorder that can interchangeably play both a standard cassette tape and a karaoke cassette tape.

There is also a need for a cassette tape player/recorder capable of providing karaoke lyrics.

SUMMARY OF THE INVENTION

In accordance with the present invention, apparatus and methods are provided for an indexed audio tape. The method includes the step of recording data in a guard band interposed between and parallel to two signal tracks used to record audio signals on an audio tape. The recorded data is shifted to frequencies higher than the bandwidth of the audio signals. A plurality of programs are recorded onto the two signal tracks with spaces between the programs. A non-audible program presence signal is recorded onto the two signal tracks coincident with and throughout each recorded program. The non-audible program presence signal is not recorded in the spaces between the programs. A program directory is recorded onto the guard band just before the start of each program recorded on the two signal tracks.

In an embodiment, text is recorded onto the guard band parallel to and corresponding to audio in the programs recorded on the two signal tracks of the audio tape. The embodiment fulfills the need of a machine to play karaoke tapes by providing a cassette tape player/recorder that can play standard cassette tapes and karaoke tapes with the lyrics recorded on a guard band of a standard cassette tape. The data in the guard band is not retrievable by a standard cassette player.

Methods and apparatus are provided for reading the directory from the guard band and for accessing a program on the tape using the directory. A high pass filter is used to filter audio on the signal tracks from the directory read from the guard band.

Methods and apparatus are also provided for playing a program from two signal tracks on an audio tape and simultaneously reading text from a guard band parallel to and between the two signal tracks, the text corresponding to audio in the programs recorded on the two signal tracks. A low pass filter is used for filtering the text on the guard band from the audio for the program and a high pass filter is used to filter audio on the signal tracks from the text read from the guard band.

A method is provided for maintaining a tape player/recorder including the steps of reading a digital test pattern from a tape, determining the bit error rate in a read digital test pattern, and displaying a message to a user if the bit error rate exceeds a threshold. The digital test pattern can be recorded and read from a guard band parallel to and between two signal tracks on an audio tape.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1 is a drawing of an audio cassette;

FIG. 2 is a cutaway drawing of a standard audio cassette showing access ports for an erase head, a record/playback head, and a tape roller;

FIG. 3 is a drawing showing the tracks on a tape;

FIG. 7 is a directory of programs recorded on an audio cassette according to the present invention;

FIG. 8 is a schematic of an audio cassette player/recorder according to the present invention;

FIG. 9 is a schematic of an alternate audio cassette player/recorder according to the present invention;

FIG. 10A is a drawing showing the audio and data tracks on a tape relative to recording/reading heads according to the present invention;

FIG. 11 is a frequency diagram according to the present invention;

DETAILED DESCRIPTION

Figure 4:
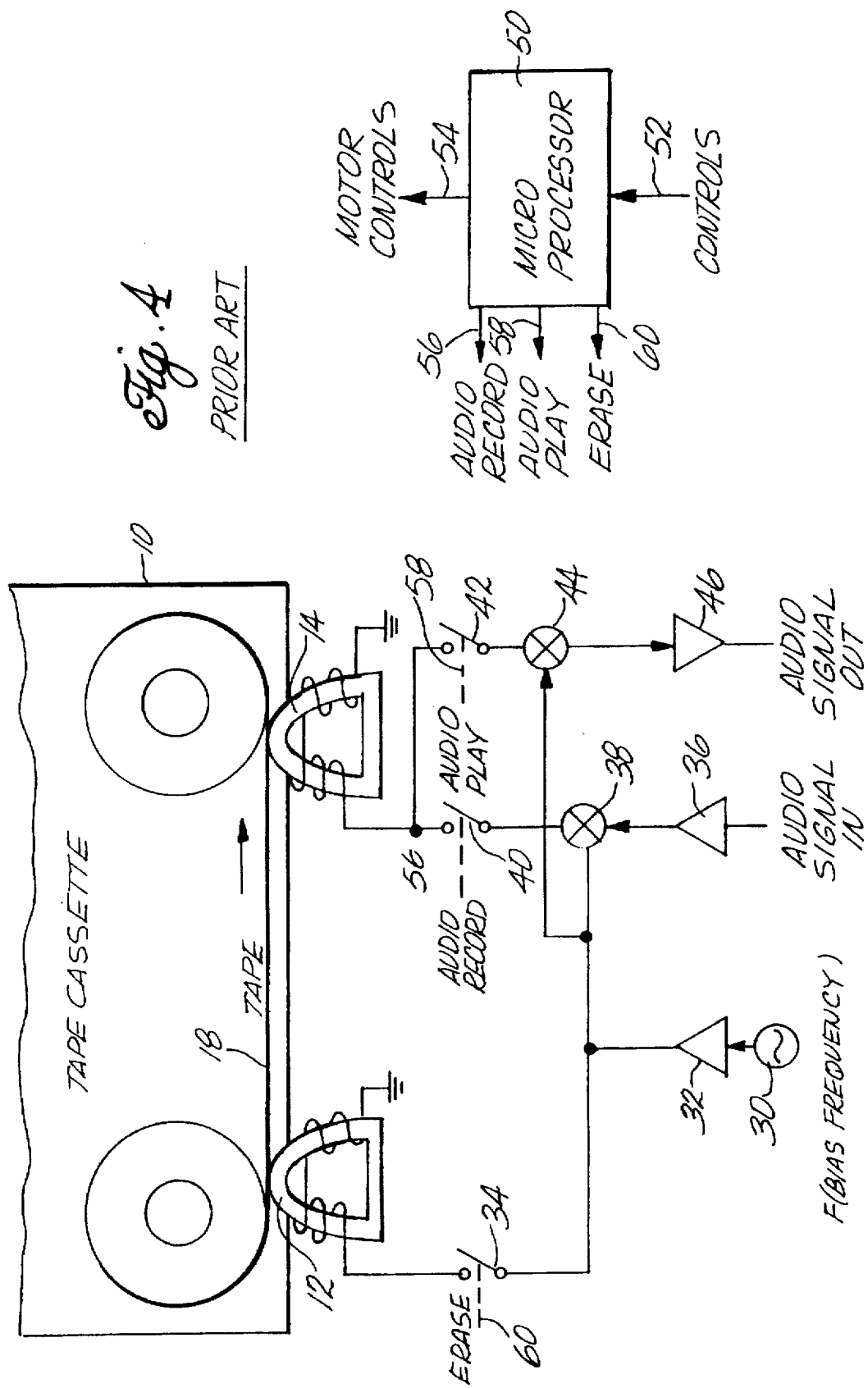
FIG. 4 is a schematic of an audio cassette player/recorder in relation to an audio cassette.

Referring now to the drawings, and more particularly, to FIG. 1, there is shown a drawing of a standard audio cassette 10. FIG. 2 is a cutaway drawing of the standard audio cassette 10 showing access ports for an erase head 12, a record/playback head 14, and a tape roller 16. The tape 18 is routed past the erase head 12, the record/playback head 14 and the tape roller 16. In a conventional audio cassette player/recorder the erase head is used for erasing the tape. The record/playback head 14 is used for both recording and playing audio signals on the tape 18. The tape roller 16 is used for controlling the speed of the movement of the tape.

FIG. 3 is a drawing showing the configuration of tracks on a standard audio cassette. The tape width of the standard audio cassette tape is 0.15 inches. On the tape four tracks are recorded designated as track #1 (20) track #2 (22), track #3 (24) and track #4 (26). Between track #1 (20) and track #2 (22) there is a guard band 23. Similarly, between track #3 (24) and track #4 (26) there is a guard band 27. Between track #2 (22) and track #3 (24) there is a guard band 25. The guard bands 23, 25 and 27 are between the signal tracks #1 and #2, between the signal tracks #2 and #3, and between tracks #3 and #4, respectively, to avoid the signal tracks from picking up signals from the adjacent tracks due to head misalignments. In this invention, apparatus and methods are provided for recording data in the guard bands 23, 25, and 27. Generally audio information is recorded into track 1 and 2 when the tape is run in one direction and audio information is then recorded in tracks 3 and 4 when the tape is run in the opposite direction.

FIG. 4 is a schematic of an audio cassette player/recorder in relation to an audio cassette. A conventional audio cassette recorder/player has a microprocessor 50 which accepts controls 52, such as rewind, stop, play, fast-forward, and erase. The microprocessor 50 sends motor controls 54 to motors that control the speed of the tape 18. The microprocessor also controls recording and playing of audio and the erasing of the tape. To record an audio signal, the microprocessor 50 outputs a control audio record signal 56 to close switch 40. An audio signal input is amplified by amplifier 36 and then mixed in mixer 38 with a bias frequency generated by oscillator 30 and amplified by amplifier 32 and sent to record/playback head 14, which records the audio signal on the tape 18. The bias frequency generator 30 is mixed with the audio signal in order to prevent a DC bias of the record/playback head 14. When controls 52 are sent to microprocessor 50 to play the tape, an audio play signal 58 is sent to switch 42 to close that switch and the record/playback head 14 senses the audio signal on the tracks of tape 18 and then the sensed signal is mixed in mixer 44 with the bias frequency from generator 30 in order to recover the audio signal, which is then amplified by amplifier 46 and output to a speaker (not shown).

To erase a tape the microprocessor sends erase signal 60 to switch 34 to close switch 34 and the bias frequency from generator 30 is recorded via erase head 12 onto tape 18 overwriting and erasing any other signal on the track being erased. Generally the erase head is designed to erase tracks 1 and 2 simultaneously or to erase tracks 3 and 4 simultaneously when the tape cassette 10 is turned over in the audio cassette recorder/player.

Figure 5:
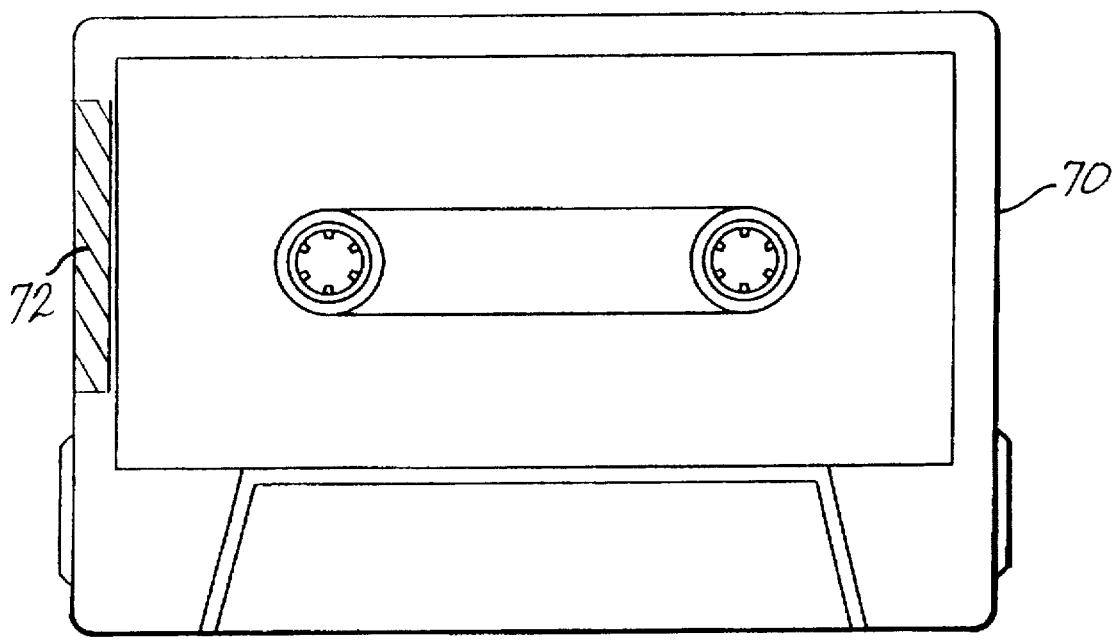
FIG. 5 is a drawing of an audio cassette with an index tape indicator according to the present invention.

FIG. 5 is the drawing of an audio cassette with an index tape indicator according to the present invention. In FIG. 5 the audio cassette 70 is very similar to audio cassette 10 shown in FIG. 1; however, the audio cassette 70 has an index tape indicator 72, which consists of a metal strip. The purpose of the index tape indicator 72 is to allow an index tape player/recorder to detect that an inserted tape is an indexed tape. The features of an indexed tape are further described below.

Figure 6:
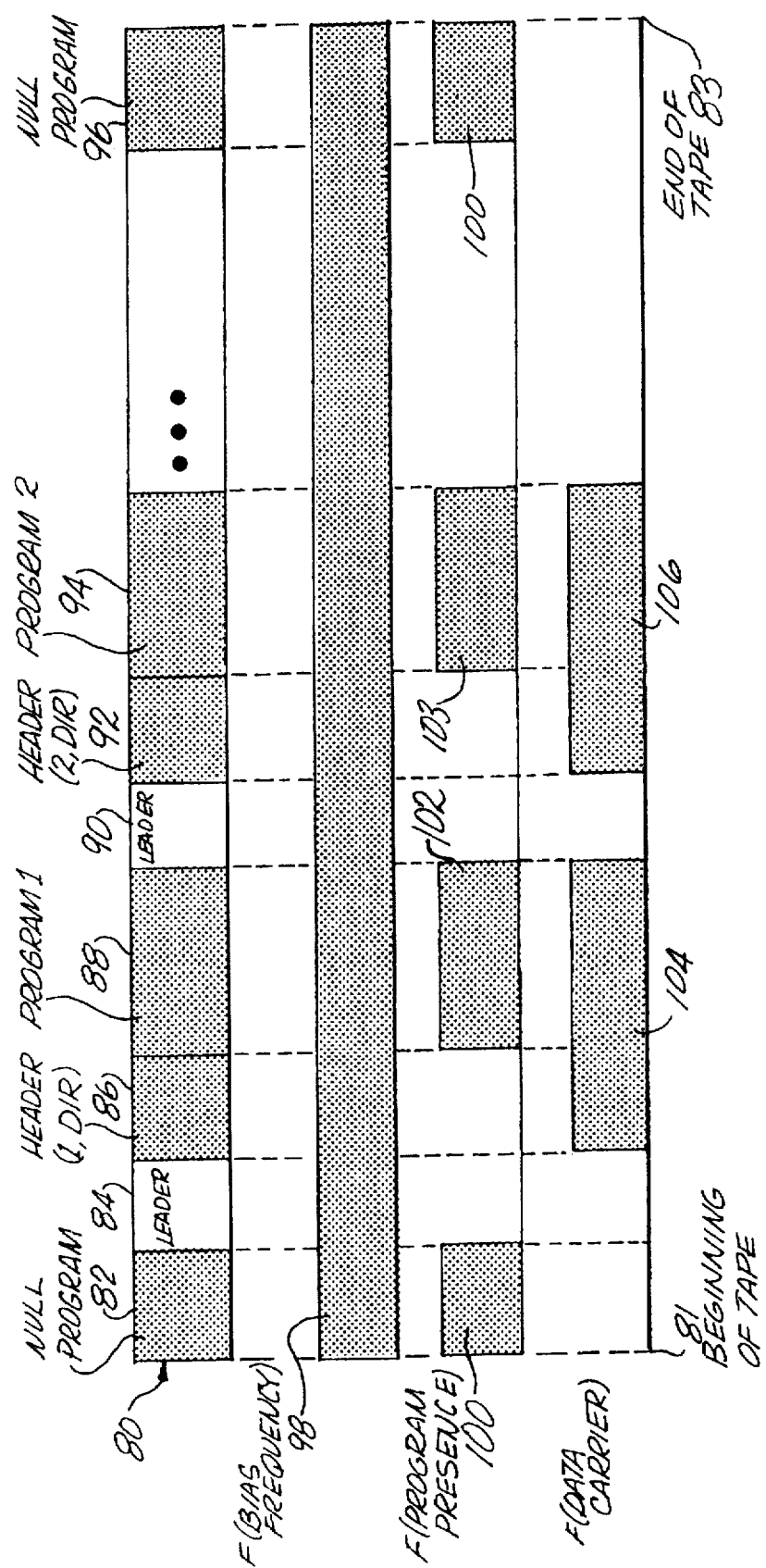
FIG. 6 is a time line of signals on a tape according to the present invention.

FIG. 6 illustrates a prerecorded tape layout for an audio cassette tape having the capability of program level indexing. The design of the various segments of the tape layout are as follows.

The beginning of the tape is indicated by line 81 and the end of the tape is indicated by line 83. In the tape layout 80, at the beginning of the tape is a null program 82. This is followed by a leader 84 which is followed by a header 86. The header 86 is followed by a program 88. Additional programs recorded on the tape have this same sequence of having a leader 90, a header 92 and then the program 94. At the end of the tape another section of null program 96 is recorded. As is indicated by the time line of bias frequency 98, all signals recorded on the tape are shifted by the bias frequency to prevent a DC bias of the heads.

The bias frequency that is used in the audio tape recording industry is 100 kilohertz. Sections of tape free of any recorded signal still have the bias frequency present. However, these sections of non-recorded signal are silent during playback. For example, leader 84 and leader 90 are silent during playback, although the bias frequency is recorded during those segments.

A program presence signal at a selected frequency is recorded during the null program sections of tape layout 80 as shown by program presence segments 100 at the beginning of the tape 81 and at the end of the tape 83. The program presence signal is also recorded coincidentally with and throughout each recorded program in tape layout 80 as shown by program presence segment 102 that corresponds to program 88, and program presence signal 103 that corresponds to program 94. The program presence signal is at a frequency that is below the human hearing limit of 20 hz. For example, the program presence signal can be recorded at 10 hertz. In practice the program presence signal can be recorded on the signal tracks 1 and 2 or recorded on the guard band as will be explained below.

The header recorded before each program contains the program number and a directory to all of the programs on the tape. For example, header 86, which is for program 1, contains the program number 1 and a directory to all the programs on the tape. Header 92 contains the program number 2 and a directory to all the programs on the tape.

FIG. 7 shows a directory 110. As shown the directory includes a program number, a program title, the cassette side 1 or 2, and the number of turns of the reel plus or minus to access the start of the program, which is designated as the seeking data 112. The seeking data in the directory will change depending on which header the directory is recorded in. For example, the number of turns from the directory recorded in header 86 to program 2 is more than the number of turns required from the directory recorded in header 92 to program 2.

The seeking data refers to the direction (+: forward −: rewind) and the number of turns of the tape required to get to the target program from the location of the current directory. For example, to get to the beginning of "Blue Hawaii" from the directory shown in FIG. 7, the tape needs to fast-forward 265 turns.

In an embodiment of the present invention the directory is recorded in the guard band and is encoded onto a data carrier frequency that insures that the data is at a supersonic frequency. For example, the data carrier can be 33 to 34 kilohertz which is well above the upper human audible frequency range of about 20 kilohertz. The directory can be recorded in the guard band at any place on the tape. For example, it can be recorded concurrent with a program or at the beginning or end of the tape.

The data carrier frequency can also be used to record text into the guard band coincidental with the lyrics in the audio of a program. As shown in FIG. 6, the data carrier frequency 104 is coincident with header 86 and program 88. Similarly, the data carrier frequency 106 is coincident with header 92 and program 94.

FIG. 10A illustrates the relationship of data track 174 with audio tracks 170 and 172 on tape 18. Audio tracks 170 and 172 correspond to track 20 and track 22 shown on FIG. 3 and data track 174 is in the position of guard band 23 on FIG. 3. The data track 174 contains the header 86 and header 92 information, as well as, any text recorded coincident with program 88 and program 94. As indicated above, the data in the data track 174 is positioned in frequency about the data carrier frequency as shown in FIG. 6 as elements 104 and 106.

FIG. 11 shows a frequency spectrum of the various segments of FIG. 6. For example, the program presence 100, 102 and 103 segments are recorded at a frequency of 10 hertz, shown for the program presence frequency 184 on FIG. 11. The program presence signal can be recorded directly onto the audio tracks because it is below human hearing. Also recorded on the audio tracks is the audio information as shown in FIG. 11 as element 182 which ranges from 20 hertz to 20 kilohertz. The information that is recorded on the data track 174 of FIG. 10A is shown in FIG. 11 as the frequency band 180 which is positioned around the data carrier frequency of 33–34 kHz. The data carrier frequency can be modulated to carry the data in a variety of ways. Two examples are duty cycle modulation (DCM) and frequency modulation (FM).

As discussed above, when recording on tape it is necessary to introduce a bias frequency in order to prevent a DC bias. This is not indicated in FIG. 11 but it should be noted that all of the bands shown on FIG. 11 are shifted by the bias frequency which means that all the frequencies shown in FIG. 11 are about 100 kilohertz higher.

FIG. 8 is a schematic of an audio cassette player/recorder according to the present invention. The audio cassette player/recorder of FIG. 8 has all the capability of the audio cassette player/recorder of FIG. 4 and includes additional capability. In particular the audio cassette player/recorder of FIG. 8 has the capability of recording a program presence signal onto the audio track and the capability for reading and writing data onto a data track which is positioned between two audio tracks. As shown the bias frequency 30 is amplified by amplifier 32 and mixed with the audio input signal in mixer 38 after the audio signal is amplified by amplifier 36. To record, the microprocessor 160 closes switch 40 by sending audio record signal 56. A program presence signal 123 can be added to the audio signal in mixer 122 under control of the microprocessor by sending program presence signal 125 to close switch 124. The audio is recorded onto tape 18 by head 14.

To read audio information from the tape, output of head 14 is sent to audio play switch 42 which is closed under control of the microprocessor by the microprocessor sending audio play signal 58 to close switch 42. The bias frequency is removed from the signal by mixing the signal with the bias frequency in mixer 44. In order to filter any signal from the data that is recorded in the data track 174 shown in FIG. 10A from the signal from the audio tracks 170 and 172 shown in FIG. 10A, an audio lowpass filter 120 is used. The output of the audio lowpass filter 120 is then amplified by amplifier 46 and sent to a speaker (not shown).

As will be explained below, there are various circumstances under which it is necessary for the microprocessor to know whether there is program presence signal within the audio output. The program presence frequency can be detected by program signal detector 121 and the output of the detector is sent to microprocessor 160.

To erase the tape, the bias frequency 30 amplified by amplifier 32 is sent via switch 34, which is closed by erase signal 60 sent from microprocessor 160, to head 126. Thus, in the erase mode the bias frequency is recorded directly onto the tape with no modulation so the other information on the tape is written over and thereby erased. Note that in FIG. 8 the bias frequency signal is shown as sent through mixer 128. If the data write switch 130 is open, then no signal is mixed with the bias frequency in mixer 128 so the bias frequency passes through mixer 128 unchanged.

To write data onto the data track 174 as shown in FIG. 10A, data input from microprocessor 160 is sent through amplifier 136 and mixed in mixer 134 with the data carrier frequency sent from oscillator 142. Data to be written on the data track can be input to the microprocessor 160 via controls 164 or other interfaces, such as a digital interface to a computer (not shown). The microprocessor 160 sends a data write command 132 to switch 130 thereby closing 130 and the data input is mixed with the bias frequency in mixer 128. The data write signal 132 also closes switch 34 which allows the data input to be recorded on the tape by head 126.

To read data from the data track 174 as shown in FIG. 10A, the signal from head 126 is sent through switch 148 which in order to read data is closed by the microprocessor via data read signal 150. The read data is then downshifted by the bias frequency via mixer 146 and then sent through a data carrier high-pass filter 144 which filters any audio signal from the data. Then the read data is again mixed with data carrier frequency 142 in mixer 138 and then sent out to the microprocessor via amplifier 140. The data sent to the microprocessor 160 can be displayed on display 162.

The audio cassette player/recorder of FIG. 8 can operate with normal audio cassettes as well as indexed audio cassettes. In order to determine whether a tape is an indexed audio tape or a non-indexed audio tape the audio cassette player/recorder has an index tape sensor 152 which can sense whether the index tape indicator 72 is on the audio tape cassette 70, as shown in FIG. 5. For example, the index indicator 72 can be a metallic strip on the side of the audio cassette. Probes 154 and 156 could make contact with the metallic strip thereby completing the circuit for the index tape sensor 152. The index tape sensor 152 has an interface to microprocessor 160. There are many other ways to implement an index tape sensor other than described here and all are included within the scope of this invention.

If the index tape sensor indicates that the tape cassette 70 is a non-indexed tape, then the microprocessor 160 will not attempt to read data from the tape. If the indexed tape sensor 152 indicates to the microprocessor 160 that the tape cassette 70 is an indexed tape then all of the capabilities shown in FIG. 8 can be employed.

In another embodiment the audio cassette player/recorder has the capability of reading data recorded in the data track 174 as shown in FIG. 10, but does not have the capability of recording or writing data into the data track 174. This embodiment is employed for the situation of prerecorded indexed audio tapes that are sold to users.

In FIG. 8 head 126 is used for two functions. The first function for head 126 is to erase any information on the tape 18. The second function of head 126 is to both read data and write data onto the data track 174 of the tape. The head 126 has an effective electrical width which allows the head to erase the 2 audio tracks and the guard track. In one embodiment, the head 126 has an effective write width of at least one of the audio tracks and the guard track. The effective read width is that of the guard track. In an alternate embodiment, the head 126 has an effective write width of at least one of the audio tracks and the guard track. The effective read width is that of at least one of the audio tracks and the guard track. The wide write width eliminates the need of imposing a stringent requirement on azimuth alignment.

FIG. 9 is a schematic of an alternate audio cassette player/recorder according to the present invention. FIG. 9 is very similar to FIG. 8 except that a separate head 168 is used to read and write data from data track 174. The separate head 168 can be a narrow head that has an effective electrical width for reading and writing approximately equivalent to the width of the guard band of the tape. The separate read head 168 can have a narrower effective electrical width than head 126, which must have a relatively wide electrical width to erase both audio tracks, as well as the guard band. The head 126 is only used to erase information on the tape. As shown in FIG. 9 head 168 is coupled to data read switch 148 and data write switch 130. The data input is recorded by amplifying it with amplifier 136 and mixing it with the data carrier frequency generated by oscillator 142 in mixer 134 and then mixed with the bias frequency in mixer 128 and sent to the head 168 through the data write switch 130 which is closed when the microprocessor 160 sends data write signal 132. The data on the tape 18 is read when the microprocessor 160 closes switch 148 by sending data read signal 150. The read data is mixed with the bias frequency in mixer 146 and then the read data is sent through a data carrier highpass filter 144, which passes the data and filters out any signal from the audio tracks. Then the data is mixed with the data carrier frequency in mixer 138 and then amplified by amplifier 140. The output data can be sent to microprocessor 160 and displayed on display 162. Recording and playing the audio and recording and detecting a program presence signal is implemented in FIG. 9 in the same manner as shown in FIG. 8.

Figure 10B:
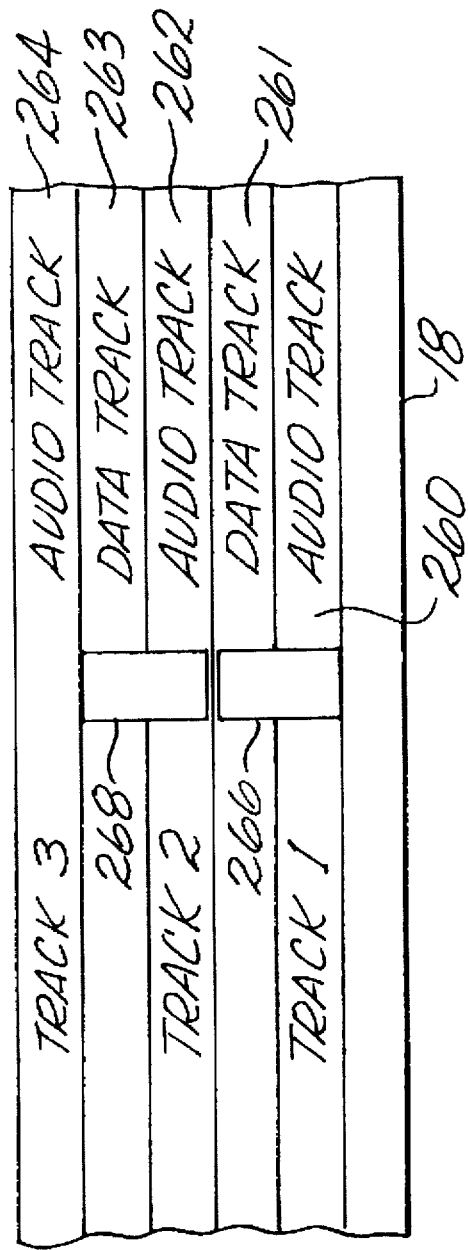
FIG. 10B is a drawing showing the audio and data tracks on a tape relative to recording/reading heads of an alternate embodiment according to the present invention.

Another embodiment of an audio cassette player/recorder according to the present invention (not shown) is very similar to FIG. 8 except that there are two data read and write or erase heads adjacent to one another that simultaneously read and write data or erase. FIG. 10B illustrates the relationship of the adjacent data read and write or erase heads 266 and 268 to the data tracks 261 and 263 and the audio tracks 260, 262 and 264. Audio tracks 260, 262 and 264 correspond to track 20, track 22 and track 24, respectively, shown in FIG. 3. Data tracks 261 and 263 are in the position of guard band 23 and guard band 25 of FIG. 3. The data in the data tracks 261 and 263 are positioned in frequency about the data carrier frequency as shown in FIG. 11 as data 180. The heads 266 and 268, in one embodiment, have an effective write width of at least one of the audio tracks and the guard track. The effective read width for each is that of the guard track. In an alternate embodiment, the heads 266 and 268 have an effective read and write width of at least one of the audio tracks and the guard track.

Figure 12:
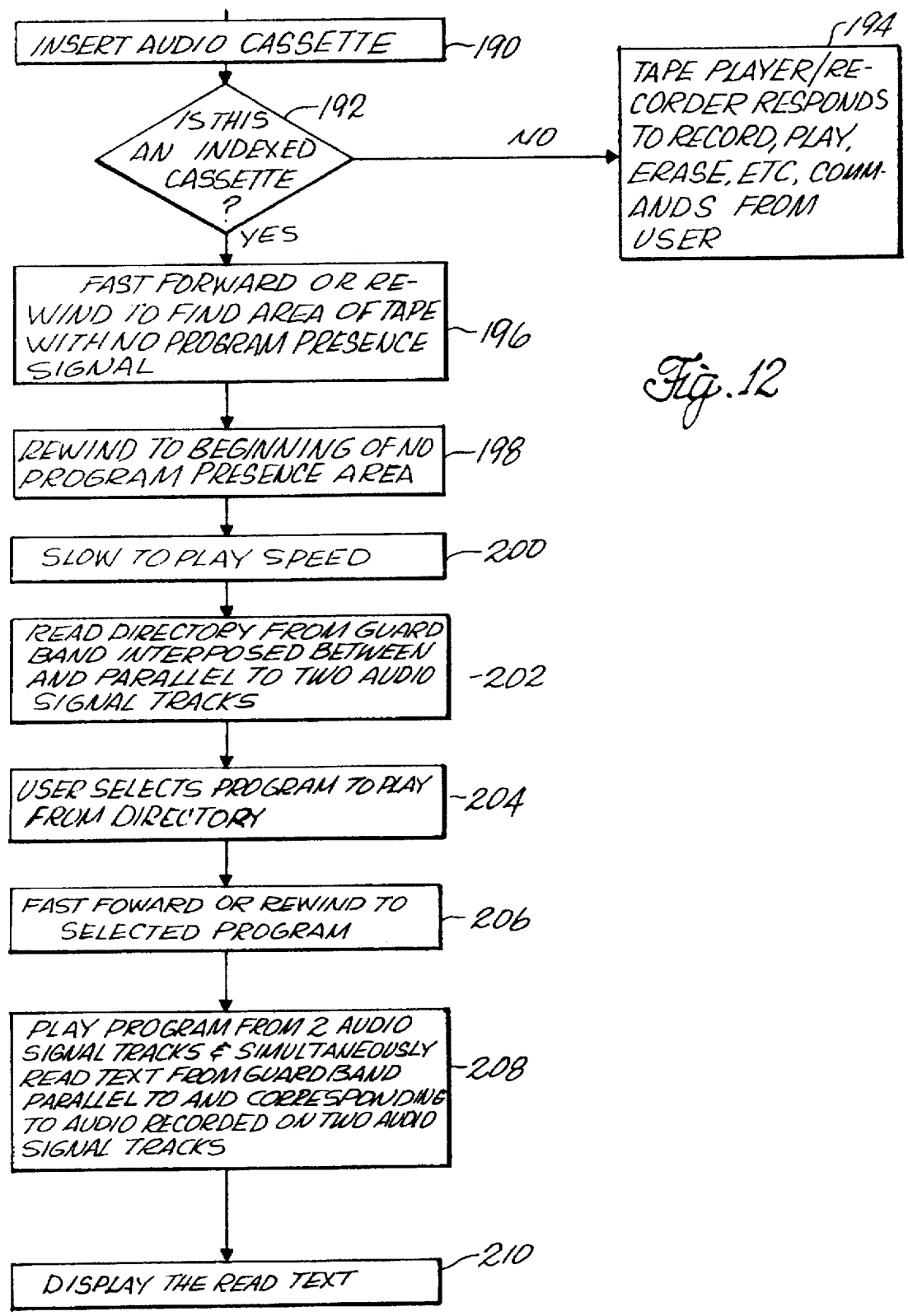
FIG. 12 is a flow diagram of a method for accessing a program using a directory and for accessing and displaying text from an audio tape according to the present invention.

FIG. 12 is a flow diagram of a method for accessing a program using a directory. FIG. 12 also is a method for accessing and displaying text read from a tape guard band corresponding to audio played from audio tracks of a tape. In step 190, an audio cassette is inserted into the audio cassette player/recorder. In step 192 it is determined whether the cassette tape is an indexed cassette. If the tape is not an indexed cassette then the cassette player/recorder responds to the normal commands from a user such as record, play, erase, etc., as shown in step 194. If the audio cassette is determined to be an indexed cassette as determined by index tape sensor 152, shown in FIG. 8 and FIG. 9, then the first step is to access a directory from the tape. In step 196 the audio cassette tape is fast-forwarded or rewound to find an area of the tape with no program presence signal. As indicated in FIG. 6 the area without any program presence signal corresponds to the leader 84 and header 86 or leader 90 and header 92. Once an area with no program presence signal is found then the tape is rewound to the beginning of the no program presence signal area in step 198, which positions the tape at the beginning of a leader. For example, the read heads at this point would be positioned at the beginning of leader 84. Then the tape is put in play speed mode in step 200. The length of the leader is made sufficiently long such that the tape speed is settled within specification of its play speed by the time the read/write heads reach the following header areas. When the heads do reach the header area such as header 86, the directory is read from the guard band interposed between and parallel to the two audio signal tracks in step 202. The directory can have a format that corresponds to FIG. 7 and can be displayed on display 162. The user selects a program to play from the directory in step 204. Then in step 206 the tape is fast-forwarded or rewound to the selected program. For example, if the user selects "Chattanooga-Choo-Choo" in FIG. 7, then the tape will be fast-forwarded by 172 turns. Then in step 208 the microprocessor 160 places the audio cassette recorder/player in play mode and closes the audio play switch 42 and the data read switch 148 of FIG. 8, for example, and plays the audio from the two audio signal tracks and simultaneously reads text from the guard band parallel to and corresponding to the audio recorded on the two signal tracks. In the discussion above, the guard band corresponds to data track 174 which is between two audio signal tracks 172 and 170 as shown in FIG. 10A. The text that is read from the guard band or data track is then displayed on display 162 in step 210.

The text that is read from the data track could be text corresponding to lyrics in a song that is being played from the audio tracks, such as with karaoke. The text in the data track can also correspond to any other information that is in the audio track, for example the data track might contain text corresponding to a speech in the audio track which could assist the hearing impaired, or allow a silent display of the text of a speech.

Figure 13:
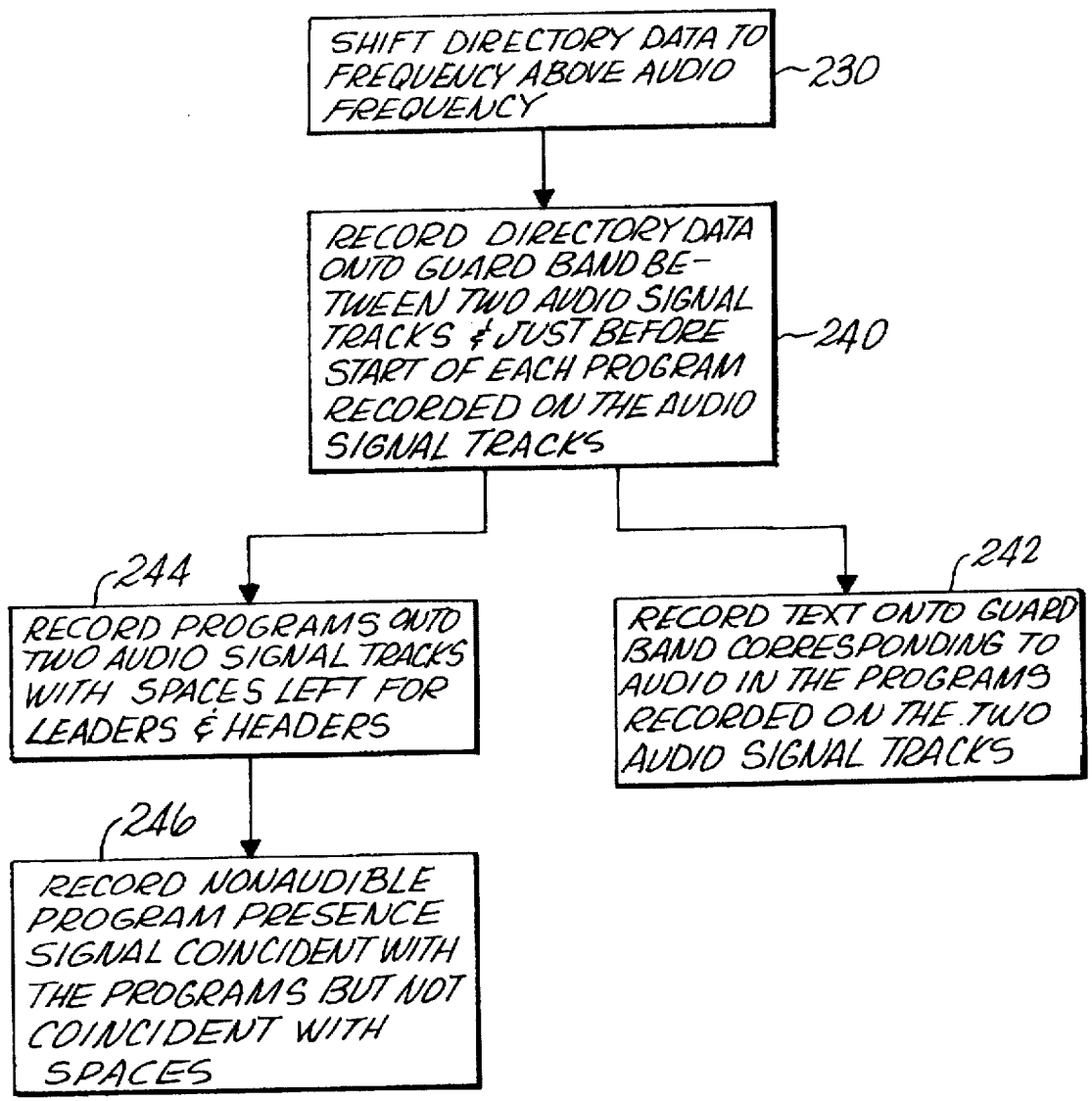
FIG. 13 is a flow diagram of a method for recording a directory for programs and for recording text on an audio tape according to the present invention.

FIG. 13 is a flow diagram of a method for recording a directory for programs and for recording text on an audio tape according to the present invention. In step 230, directory data is shifted to a frequency above the audio frequency. This can be accomplished by mixing the data carrier frequency generated by oscillator 142 with the data input with mixer 134 as shown in FIG. 8. Then the directory data is recorded onto the guard band between the two audio signal tracks and is recorded just before the start of each program recorded on the signal tracks as shown in step 240. Then simultaneously, as each program is recorded onto the two signal tracks as shown in step 244, text can be recorded onto the guard band. The text would correspond to audio in the programs recorded on the two signal tracks as shown in step 242. Also a nonaudible program presence signal can be recorded coincident with the program (step 246), but not coincident with spaces between programs as shown in FIG. 6. The steps 242, 244, and 246 can be repeated for each program and spaces would be left between programs for leader areas and header areas. Step 240 could be repeated to record directory data into the guard band before the start of each program recorded on the signal tracks. As indicated before, the directory data would be modified so that the seeking data 112 shown in FIG. 7 would correspond to the position of the directory on the tape.

Another capability of the audio cassette player/recorder of FIGS. 8 and 9 is the capability for automatic generation of maintenance messages. It is known that the quality of the audio output of an audio tape degrades significantly after extended usage due to tape wear and residue buildup on the heads of the audio cassette player/recorder. Other than replacing the cassette tape, cleaning of the heads of the audio cassette player/recorder can largely restore the audio quality. Deciding when to perform the process of cleaning the heads of a conventional audio cassette player/recorder is a subjective judgement. The audio cassette player/recorder of the present invention makes the process of deciding when to clean the heads an objective test. A digital pattern is encoded and recorded onto the data track 174 of the tape. When the data track is read, the microprocessor 160 in the audio cassette player/recorder can automatically measure the bit error rate of the recorded digital pattern and automatically remind the user of required maintenance if the bit error rate exceeds a threshold. This allows the audio quality to be maintained at a high level without the user having to remember any particular maintenance schedule.

Figure 14:
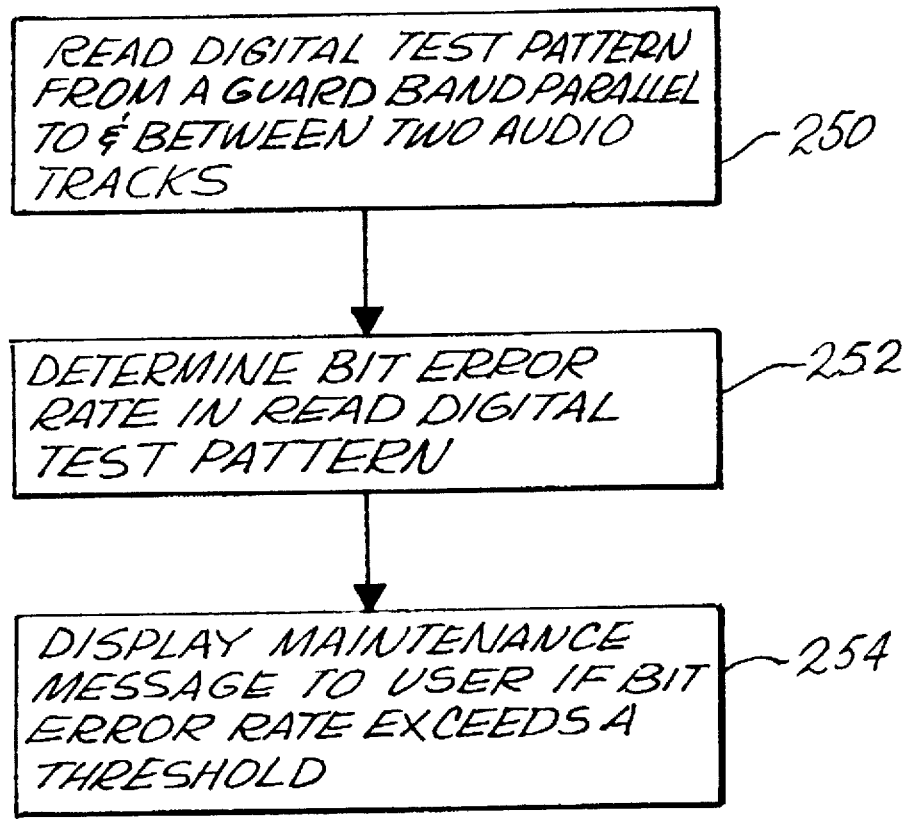
FIG. 14 is a flow diagram of a method for determining maintenance requirements for an audio tape according to the present invention.

FIG. 14 is a flow diagram of a method for determining maintenance requirements for an audio tape according to the present invention. In step 250 a digital test pattern is read from a guard band parallel and between two audio signal tracks. Then in step 252 the bit error rate of the read digital test pattern is determined. Then in step 254 a maintenance message is displayed to a user if the bit error rate exceeds a threshold.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. An apparatus for audio tape indexing comprising means for playing an audio program in stereo from two signal tracks, said two signal tracks comprising left and right channel tracks, and means for simultaneously reading data recorded in a guard band interposed between and parallel to said two signal tracks, said data corresponding to the audio in the programs recorded on said two signal tracks.

2. The apparatus of claim 1 wherein the means for reading data from the guard band comprises means for filtering the frequencies of the audio signals.

3. The apparatus of claim 2 wherein the means for reading data from the guard band further comprises a head that has an electrical read width that is approximately the width of the guard band on the tape.

4. The apparatus of claim 2 further comprising means for reading the audio signals from the two signal tracks without interference from the data recorded in the guard band.

5. The apparatus of claim 4 wherein the means for reading the audio signals from the two signal tracks without interference comprises a low pass filter.

6. The apparatus of claim 2 further comprising means for recording data onto the guard band interposed between and parallel to the two signal tracks used to record audio signals on an audio tape.

7. The apparatus of claim 6 wherein the means for recording data onto the guard band further comprises a means for shifting the frequency of the data to frequencies higher than the frequencies of the audio signals.

8. The apparatus of claim 6 wherein the means for recording data onto the guard band further comprises a write head having an electrical write width approximately the width of the two signal tracks and the guard band.

9. The apparatus of claim 2 further comprising means for recording a nonaudible program presence signal onto the audio tape wherein the nonaudible program presence signal indicates an audio signal is recorded on the two signal tracks.

10. The apparatus of claim 9 further comprising means for detecting the program presence signal on the audio tape.

11. A method for providing indexed audio on a magnetic tape, said magnetic tape comprising a right channel track and a left channel track for recording and reproducing stereo audio signals, comprising the steps of:

shifting the frequency of data to frequencies higher than the bandwidth of the audio signals; recording the frequency shifted data in a guard band interposed between and parallel to said right and left channel tracks;

recording a plurality of programs onto the left and right channel tracks with spaces on the channel tracks between the programs; and recording a non-audible program presence signal onto the left and right channel tracks coincident with the plurality of programs wherein the nonaudible program presence signal is not recorded in the spaces between the programs.

12. The method of claim 11 further comprising the step of recording a program directory onto the guard band just before the start of each program recorded on the left and right channel tracks.

13. The method of claim 12 further comprising the step of recording text in the guard band parallel to and corresponding to audio in the programs recorded on the left and right channel tracks of the audio tape.

14. A method for providing an indexed audio tape comprising the steps of playing a program from a left channel track and a right channel track and simultaneously reading text from a guard band parallel to and between the left and right channel tracks, the text corresponding to audio in the programs recorded on the left and right channel tracks.

15. The method of claim 14 further comprising the step of displaying the read text.

16. The method of claim 14 further comprising the step of high pass filtering the read text to filter out audio signals.

17. A method for providing indexed audio on a magnetic tape, said magnetic tape comprising a right channel track and a left channel track for recording and reproducing stereo audio signals, comprising the steps of:

determining whether the tape is an indexed tape;

searching the tape to find an area of the tape with no program presence signal, wherein the program presence signal indicates the presence of a program coincident with the program presence signal;

rewinding the tape to a beginning of the area with no program presence signal; and playing the tape at play speed to read directory data from a guard band interposed between and parallel to said right and left channel tracks.

18. The method of claim 17 further comprising the step of high pass filtering the read directory data to filter out audio signals.

19. The method of claim 17 further comprising the steps of:

selecting a program from the directory to play; and rewinding or fast forwarding the tape to the selected program.

20. An apparatus for audio tape indexing comprising:

two signal tracks on an audio tape used to record a plurality of segments, each segment comprising a program and a directory, the directory in each segment comprising data for accessing other programs recorded on the tape;

means for recording a nonaudible program presence signal onto the audio tape, the nonaudible program presence signal being only recorded coincident with the programs recorded on the tape;

means for detecting a portion of tape having an absence of the nonaudible program presence signal;

means for rewinding to a start of the detected portion of tape having the absence of the nonaudible program presence signal; and means for reading the directory in the portion of tape having the absence of the nonaudible program presence signal.

21. The apparatus of claim 20 further comprising:

means for recording data onto a guard band interposed between and parallel to the two signal tracks; and means for reading recorded data from the guard band interposed between and parallel to the two signal tracks.

22. The apparatus of claim 21 wherein the means for recording data onto the guard band further comprises a means for recording the data at a first frequency higher than second frequencies for recording the plurality of segments onto the two signal tracks.

23. The apparatus of claim 21 wherein the recorded data comprises a program directory.

24. The apparatus of claim 20 wherein the means for recording a nonaudible program presence signal onto the audio tape comprises a means for recording the nonaudible program presence signal at a first frequency lower than second frequencies for recording the plurality of segments onto the two signal tracks.

25. The apparatus of claim 20 further comprising means for simultaneously recording text on a guard band parallel to and between the two signal tracks while a program is recorded on the two signal tracks, the text corresponding to audio in the programs recorded on the two signal tracks.

26. The apparatus of claim 25 further comprising means for playing a program from the two signal tracks and simultaneously reading text from the guard band parallel to and between the two signal tracks, the text corresponding to audio in the programs recorded on the two signal tracks.

27. A method for audio tape indexing comprising the steps of:

recording a plurality of segments on two signal tracks on an audio tape, each segment comprising a program and a directory, the directory in each segment comprising data for accessing other programs recorded on the tape;

recording a nonaudible program presence signal onto the audio tape, the nonaudible program presence signal being only recorded coincident with the programs recorded on the tape;

detecting a portion of tape having an absence of the nonaudible program presence signal;

rewinding to a start of the detected portion of tape having the absence of the nonaudible program presence signal; and reading the directory in the portion of tape having the absence of the nonaudible program presence signal.

28. The method of claim 27 further comprising the steps of recording a program directory onto a guard band interposed between and parallel to the two signal tracks.

29. The method of claim 28 further comprising the steps of reading the program directory recorded on the guard band interposed between and parallel to the two signal tracks.

30. The method of claim 27 further comprising the steps of simultaneously recording text on a guard band parallel to and between the two signal tracks while a program is recorded on the two signal tracks, the text corresponding to audio in the programs recorded on the two signal tracks.

31. The method of claim 30 further comprising the steps of:

playing a program from the two signal tracks;

simultaneously reading text from the guard band parallel to and between the two signal tracks, the text corresponding to audio in the programs recorded on the two signal tracks; and displaying the read text.

32. The method of claim 30 wherein the step of recording text onto the guard band further comprises the step of recording the text at a first frequency higher than second frequencies for recording the plurality of segments.

33. The method of claim 27 wherein the step of recording a nonaudible program presence signal onto the audio tape comprises the step of recording the nonaudible program presence signal at a first frequency lower than second frequencies for recording the plurality of segments.

* * * * *